United States Patent [19]

Kowalyshen

[11] Patent Number: 4,616,856
[45] Date of Patent: Oct. 14, 1986

[54] NOZZLE AND RETAINING ARRANGEMENT

[75] Inventor: Henry W. Kowalyshen, Chicago, Ill.

[73] Assignee: S&C Electric Company, Chicago, Ill.

[21] Appl. No.: 726,860

[22] Filed: Apr. 25, 1985

[51] Int. Cl.$^4$ ............................................. A16L 15/00
[52] U.S. Cl. ..................................... 285/92; 285/238; 285/921; 411/337
[58] Field of Search .................. 285/92, 921, 238, 355, 285/390, 906; 411/508, 509, 510, 386, 305, 306, 318, 182, 337, 352; 403/320

[56] References Cited

U.S. PATENT DOCUMENTS 4,426,105  1/1984  Plaquin et al. ........................ 285/92
4,474,392  10/1984  Vassallo et al. ............ 285/DIG. 22

FOREIGN PATENT DOCUMENTS 2160894  6/1973  Fed. Rep. of Germany ...... 285/238
2822259  12/1978  Fed. Rep. of Germany ... 285/DIG. 22

Primary Examiner—Dave W. Arola
Attorney, Agent, or Firm—James V. Lapacek

[57] ABSTRACT

A retention arrangement is provided for two members that are arranged to be assembled one within the other. The retention arrangement includes cooperating structure of the two members that is operative after the two members are assembled to a predetermined point; for example, by the threading of one member within the other to a predetermined point of engagement. The cooperating structure includes the provision of an annular ridge formed on the inside of a first of the members, the first member being threadingly engaged or otherwise assembled into the second member, and the provision of an annular ridge on the outside of the second member. The two ridges move past each other after a first predetermined point of engagement between the two members. Further engagement of the two members causes the two ridges to cooperate so as to interfere with each other upon any tendency toward disassembly of the two members. In one specific embodiment, the first member is a tubular nozzle with external threads that is threaded into a second tubular, receiving member having mating internal threads. The annular ridge on the nozzle is provided on the portion of the nozzle that first enters the receiving member. The annular ridge on the receiving member is provided a predetermined distance within the receiving member to define a predetermined amount of engagement of the nozzle within the receiving member before the two ridges interact. Preferably, at least one ridge is provided with a tapered surface on the portion that leads the ridge in engagement. The annular ridge on the first member defines an increasing outer diameter along the direction of engagement and the second member defines a decreasing inner diameter along the direction of engagement.

8 Claims, 5 Drawing Figures

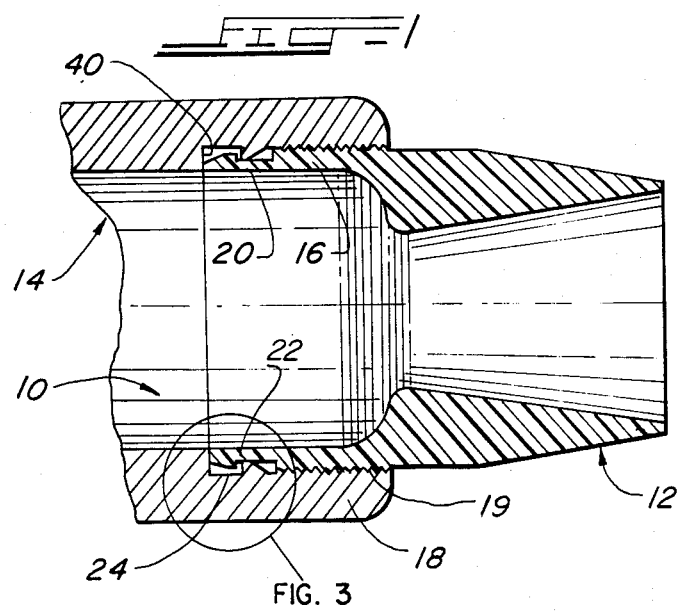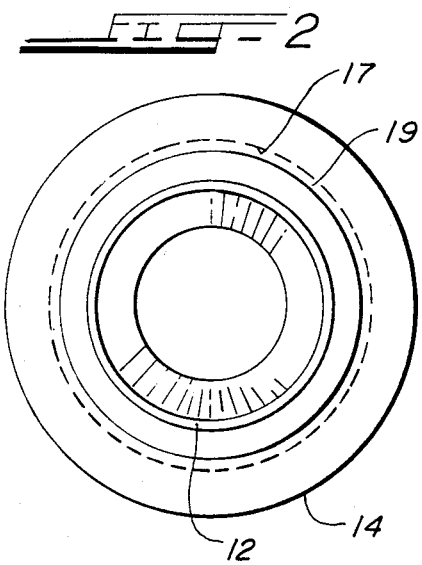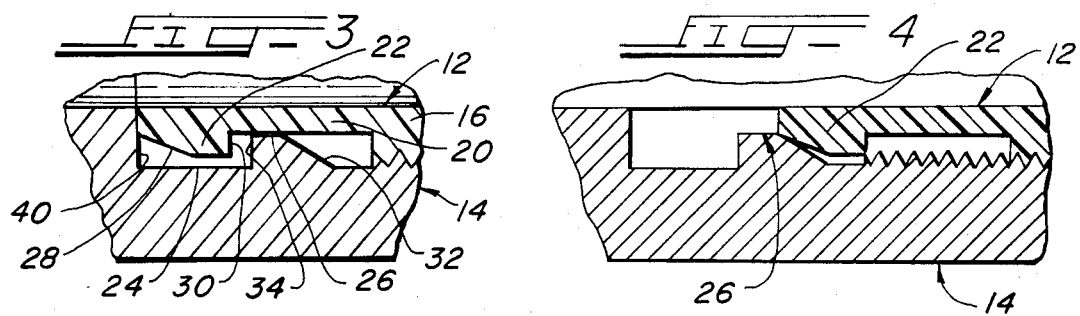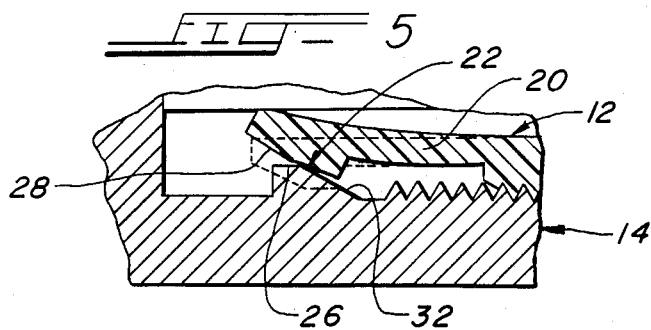

NOZZLE AND RETAINING ARRANGEMENT

BACKGROUND OF THE INVENTION

1. Field of the Invention

The present invention relates generally to the field of retention arrangements between two members and more particularly to an improved arrangement for securing two assembled members by cooperating structure of the two members that is operative after a predetermined assembly of the two members one into the other.

2. Description of the Related Art

Various arrangements are known to secure two assembled members. In the case of members which are threadingly engaged one within the other, one arrangement provides retention between the two members by the addition of a retaining nut and the obliteration of a portion of an adjacent thread for the nut thereby preventing loosening of the nut. Other arrangements use cementing or a retaining pin or the like to fix or stake the assembled members.

These arrangements have the various drawbacks of additional parts, complex assembly and/or unreliable retention of the two members to high loads applied between the two members.

SUMMARY OF THE INVENTION

Accordingly, it is a principal object of the present invention to provide an improved retention arrangement for two assembled members, the retention arrangement including cooperating structure of the two members that is operative after the two members are assembled to a predetermined point.

It is another object of the present invention to provide a retention arrangement for two members that are threadingly engaged one into the other; the retention arrangement being provided by cooperating structure of the two members that inhibits disassembly of the two members after a predetermined amount of threading engagement between the two members and that allows loads applied between the two members to be distributed substantially on the threaded, engaged portions of the two members.

It is yet another object of the present invention to provide an arrangement for securely retaining one member that is threadingly engaged inside a second member by the provision of an annular ridge provided on the outer periphery of the first member and an annular ridge on the inside periphery of the second member with the annular ridges being arranged and dimensioned in a predetermined relationship such that after a predetermined amount of threading engagement of the first member into the second member, the annular ridges move past and over one another and proceed to interlock upon subsequent threading engagement; the two annular ridges interferring with each other upon attempted unthreading of the two members.

Briefly, these and other objects and advantages of the retention arrangement of the present invention are efficiently achieved by the provision of cooperating structure on two members that are arranged to be assembled one within the other. The retention arrangement is operative after the two members are assembled to a predetermined point; for example, by the threading of one member within the other to a predetermined point of engagement. The cooperating structure includes the provision of an annular ridge formed on the inside of a first of the members, the first member being threadingly engaged or otherwise assembled into the second member, and the provision of an annular ridge on the outside of the second member. The two ridges move past each other after a first predetermined point of engagement between the two members. Further engagement of the two members causes the two ridges to cooperate so as to interfere with each other upon any tendency toward disassembly of the two members. In one specific embodiment, the first member is a tubular nozzle with external threads that is threaded into a second tubular, receiving member having mating internal threads. The annular ridge on the nozzle is provided on the portion of the nozzle that first enters the receiving member. The annular ridge on the receiving member is provided a predetermined distance within the receiving member to define a predetermined amount of engagement of the nozzle within the receiving member before the two ridges interact. Preferably, at least one of the ridges is provided with a tapered surface portion that leads the ridge in engagement. The annular ridge on the first member defines an increasing outer diameter along the direction of engagement and the second member defines a decreasing inner diameter along the direction of engagement. Preferably, the portions and surfaces of the ridges that interlock after one ridge passes by the other are preferably steep, nearly annular surfaces.

BRIEF DESCRIPTION OF THE DRAWING

The invention both as to its organization and method of operation, together with further objects and advantages thereof, will best be understood by reference to the following specification taken in conjunction with the accompanying drawing in which like reference numerals refer to like elements and in which:

FIG. 1 is a sectional view of the retention arrangement of the present invention as applied to two threadingly engaged tubular members and illustrated in the operative position;

FIG. 2 is an elevational view of the retention arrangement of FIG. 1;

FIGS. 3–5 are enlarged sectional views of portions of the members of FIG. 1 and illustrating the retention arrangement of the present invention in various stages during assembly of the two members: FIG. 4 illustrating a position of initial engagement of the two members; FIG. 5 illustrating engagement of the cooperating structure of the retention arrangement provided on the two members during an intermediate stage of engagement; and FIG. 3 illustrating the retention arrangement in the operative, interlocking, retention stage after a predetermined amount of engagement of the two members.

DETAILED DESCRIPTION

Referring now to FIGS. 1 and 2, the retention arrangement 10 of the present invention is illustrated therein as applied to the retention of a first tubular member 12 within a second tubular member 14. For example, the first tubular member 12 is a nozzle and the second tubular member 14 is a receiver or carrier for the nozzle. The nozzle is particularly adapted for use in a puffer-type circuit interrupter unit. However, it should be understood that while the present invention is illustrated and described herein with respect to the nozzle and carrier, the present invention has application to members of various geometric shape and materials that are assembled in various manners. For facility of description and not in any limiting sense, the first member 12 will hereinafter be referred to as the nozzle 12 and the second member 14 will be referred to as the carrier 14.

The nozzle 12 includes a first portion 16 having external threads 17. Similarly, the carrier 14 includes a first portion 18 having internal threads 19. Referring now additionally to FIG. 3 and considering the retention arrangement 10, the nozzle 12 includes a second portion 20 of reduced outer diameter with respect to the first portion 16. The second portion 20 is leading with respect to the first portion 16 concerning insertion and engagement into the carrier 14. The second portion 20 also includes at the leading section thereof an annular ridge 22 protruding outwardly therefrom and defining an annular ring of generally increased diameter with respect to the second portion 20 but of smaller diameter than the first portion 16.

The carrier 14 includes a second portion 24 with an annular ridge 26 protruding inwardly therefrom. The ridge 22 of the nozzle 12 includes a tapered leading section 28 and an abrupt trailing edge 30 that forms an annular surface. The ridge 26 of the carrier 14 is a tapered or flared section 32 that is first to be engaged by the nozzle 12 and a last-to-be engaged abrupt, trailing edge 34 that forms an annular surface.

Considering now the operation of the retention arrangement 10 of the present invention, FIGS. 1 and 3 illustrate the retention arrangement 10 after it has been rendered operative to securely retain the nozzle 12 within the carrier 14; this condition being achieved by threading engagement of the nozzle 12 into the carrier 14 to a predetermined amount as defined by the relative positioning of the ridges 22 and 26 on the nozzle 12 and the carrier 14 respectively. Specifically, after the threading engagement to the predetermined point, the edge 30 of the ridge 22 interferes with the edge 34 of the ridge 26 so as to inhibit movement of the nozzle 12 with respect to the carrier 14 in the direction of unthreading. Thus, the interfering relationship of the ridges 22 and 26 after assembly of the nozzle 12 into the carrier 14 to a predetermined point securely retains the nozzle 12 to the carrier 14 in spite of high impact loads or vibration between the nozzle 12 and the carrier 14. Further, the threads 17 and 19 bear substantially all the load due to any forces being applied between the nozzle 12 and the carrier 14. While the terms interfering relationship and interference are used for description purposes, it should be understood that the retention arrangement 10 may also be referred to as providing interlocking of the ridges 22 and 26 or as providing a non-reversible detent after threaded engagement.

Turning now to a discussion of the manner in which the retention arrangement 10 is rendered operative and referring additionally to FIGS. 4 and 5, the sequence of FIG. 4 to FIG. 5 to FIG. 3 represents the continuining threading of the nozzle 12 into the carrier 14 by engagement and threading of the threads 17 and 19. Specifically, the relative postions of the nozzle 12 and the carrier 14 in FIG. 4 represents initial threading engagement of the threads 17 and 19 to a first predetermined point whereat the ridge 22 of the nozzle 12 has not yet reached the ridge 26 of the carrier 14. Subsequent continued threading of the nozzle 12 into the carrier 14 results in the relative change in positions from FIG. 4 to FIG. 5. Upon continued threading engagement and referring to FIG. 5, the tapered surface 28 of the ridge 22 on the nozzle 12 engages the tapered surface 32 of the ridge 26 on the carrier 14 such that the ridge 22 moves over and past the ridge 26 with deformation of the portion 20 of the nozzle 12 since it is less rigid and more easily deformable than the carrier 14 in the illustrative embodiment.

With continuing threading engagement of the nozzle into the carrier 14, the ridge 22 moves past the ridge 26, as represented by the sequence of FIG. 5 to FIG. 3, whereupon the retention arrangement 10 is rendered operative as the portion 20 of the nozzle 12 resiliently returns or "snaps back" into the increased-diameter recess 24 of the carrier 14; the ridges 22 and 26 at respective edges 30 and 34 interlocking or interferring similar to the teeth of a ratchet and pawl arrangement or a detent arrangement.

For appropriate assembly to practice the present invention, the nozzle 12 is threaded into the carrier 14 until the resistance of the interacting ridges 22 and 26 is encountered. The rotational assembly force is then increased to drive the ridge 22 past the ridge 26; the ridge 22 returning to its undeformed position to lock the nozzle 12 to the carrier 14. From FIG. 1, it can be seen that the appropriate length of the threaded portions 16,18 with respect to the positioning of the ridges 22 and 26 is utilized to determine a predetermined point of engagement that is visible from the outside of the assembly. Further, the reduced, inside-diameter section 40 of the carrier 14 provides a stop or limit to define the appropriate amount of insertion of the nozzle 12 within the carrier 14.

-While there has been illustrated and described various embodiments of the present invention, it will be apparent that various changes and modifications will occur to those skilled in the art. For example, in other specific embodiments, the retention arrangement 10 is provided on portions of the members that are not aligned along the threaded, insertion surface. It should be realized that the retention arrangement may be provided between any two appropriate, interacting portions of the two members. For example, the retention arrangement may be provided on the leading section of the outer member and the trailing section of the inner member. Further, it should be also realized that the two members can be assembled by other than threaded engagement. Additionally, the precise geometry of the ridges is not limited to that illustrated and described herein since the retention arrangement of the present invention can be provided in numerous ways by the interacting relationship of control surfaces and mechanisms of various types. Still further, while the illustrative embodiment utilized the nozzle 12 being less rigid and more easily deformable than the carrier 14, it should be realized that either one or both of the members may be resiliently deformable.

Accordingly, it is intended in the appended claims to cover all such changes and modifications as fall within the true spirit and scope of the present invention.

What is claimed and desired to be secured by Letters Patent of the United States is:

1. An arrangement for retaining a first member within a second member, the first member including outer threads and the second member including mating internal threads, wherein the improvement comprises a first protruding ridge formed on the outside of the first member at a predetermined location, and a second protruding ridge formed on the inside of the second member at a predetermined location, said first and second members being circumferentially continuous at said predetermined locations, upon engagement of the first member into the second member said first ridge moving over and past said second ridge, upon subsequent continuing engagement to a predetermined point of engagement of the two members said first and second ridges interfering in the direction of disassembly of the two members, one of the members in the vicinity of said respective ridge being resiliently deformable with respect to the engaged portion of the other member.

2. The arrangement of claim 1 wherein each of said members is resiliently deformable in at least the vicinity of said ridges.

3. The arrangement of claim 1 wherein said first ridge is an annular ridge and said second ridge is an annular ridge.

4. The arrangement of claim 3 wherein said first ridge leads the threads of said first member upon engagement of said two members.

5. The arrangement of claim 4 wherein the length of said threads on said first member is a predetermined length that is defined along with said predetermined location of said first ridge to provide said interference of said first and second ridges when the last threads on said first member are engaged.

6. The arrangement of claim 5 wherein said second member includes means for defining a stop surface that is abutted by said first member upon engagement to said predetermined point whereat said first and second ridges interfere for relative movement between the two members in the direction of disassembly.

7. The arrangement of claim 1 wherein said first member includes a tapered-surface portion leading said first ridge upon engagement, said tapered-surface portion being defined along the direction of engagement and defining an increased cross section of said first member on the leading portion of said tapered-surface portion and a decreased cross section on the trailing portion of said tapered-surface portion.

8. The arrangement of claim 7 wherein said second member includes a tapered-surface portion arranged to cooperate with said tapered-surface portion of said first member.

* * * * *

UNITED STATES PATENT AND TRADEMARK OFFICE
CERTIFICATE OF CORRECTION

PATENT NO. : 4,616,856
DATED : Oct. 14, 1986
INVENTOR(S) : Henry W. Kowalyshen

It is certified that error appears in the above—identified patent and that said Letters Patent is hereby corrected as shown below:

Col. 3, line 56, "contininuing" should be -- continuing --.

Claim 6, col. 6, line 3, "5" should be -- 4 --.

Signed and Sealed this

Twenty-second Day of March, 1988

*Attest:*

DONALD J. QUIGG

*Attesting Officer*     *Commissioner of Patents and Trademarks*